United States Patent
Kim et al.

(10) Patent No.: US 12,512,534 B2
(45) Date of Patent: Dec. 30, 2025

(54) CRACK-PREVENTION SEALING BLOCK FOR POUCH-SHAPED SECONDARY BATTERIES, POUCH-SHAPED BATTERY CASE MANUFACTURED USING THE SAME, AND METHOD OF SEALING POUCH-SHAPED BATTERY CASE

(71) Applicant: LG Chem, Ltd., Seoul (KR)

(72) Inventors: Tae Kyu Kim, Daejeon (KR); Byeong Kyu Lee, Daejeon (KR); Cha Hun Ku, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 27 days.

(21) Appl. No.: 16/673,136

(22) Filed: Nov. 4, 2019

(65) Prior Publication Data
US 2020/0067034 A1 Feb. 27, 2020

Related U.S. Application Data

(63) Continuation of application No. PCT/KR2018/007477, filed on Jul. 2, 2018.

(30) Foreign Application Priority Data

Oct. 17, 2017 (KR) .......................... 10-2017-0134309

(51) Int. Cl.
*H01M 2/02* (2006.01)
*H01M 50/103* (2021.01)
(Continued)

(52) U.S. Cl.
CPC ....... *H01M 50/103* (2021.01); *H01M 50/184* (2021.01); *H01M 50/394* (2021.01);
(Continued)

(58) Field of Classification Search
CPC ............. H01M 50/105; H01M 50/178; H01M 10/0431; H01M 50/103; H01M 50/183;
(Continued)

(56) References Cited

U.S. PATENT DOCUMENTS 6,007,264 A    12/1999   Koptis
9,741,974 B2    8/2017   Kwon et al.
(Continued)

FOREIGN PATENT DOCUMENTS

CN    1332656 A    1/2002
CN    102832357 A    12/2012
(Continued)

OTHER PUBLICATIONS

Hong Seob Lee; "KR20160019259A Sealing Apparatus of Pouch Type Secondary Batter"; ESpacenet Machine Translation (Year: 2016).*
(Continued)

*Primary Examiner* — Allison Bourke
*Assistant Examiner* — Charlene Bermudez
(74) *Attorney, Agent, or Firm* — Lerner David LLP

(57) ABSTRACT

A sealing block for sealing a pouch-shaped secondary battery includes a main body unit for sealing at least a part of an outer edge of a battery case from which an electrode terminal protrudes by applying heat and/or pressure thereto and a wrinkle prevention unit coupled perpendicularly to one surface of the main body unit, the wrinkle prevention unit including a curved structure that corresponds to a rounded corner of an electrode assembly reception unit of the battery case, wherein the wrinkle prevention unit further includes an extension portion for connecting the curved structure of the wrinkle prevention unit to the main body (Continued)

BEFORE DEGASSING

AFTER DEGASSING unit. Sealing may be performed when the wrinkle prevention unit is adjacent to the electrode assembly reception unit via the extension portion.

14 Claims, 5 Drawing Sheets

(51) Int. Cl.
*H01M 50/184* (2021.01)
*H01M 50/30* (2021.01)
*H01M 50/553* (2021.01)
H01M 50/119 (2021.01)
H01M 50/121 (2021.01)
H01M 50/124 (2021.01)

(52) U.S. Cl.
CPC ........ *H01M 50/553* (2021.01); *H01M 50/119* (2021.01); *H01M 50/121* (2021.01); *H01M 50/124* (2021.01)

(58) Field of Classification Search
CPC ........ H01M 10/0404; H01M 10/0468; H01M 10/0481; H01M 10/049; H01M 50/202; H01M 10/02; H01M 10/04; H01M 10/0409; H01M 10/0436; H01M 10/058; H01M 10/34; H01M 10/38; H01M 2220/30; H01M 50/136; H01M 50/609; H01M 50/627; H01M 50/184; H01M 50/342; H01M 10/0486; H01M 50/131; H01M 50/618; H01M 50/73; B65B 51/10; B65B 51/14; B65B 51/146; B65B 51/148; B65B 53/00; B65B 53/02; B65B 67/04; B65B 67/06; B65B 51/00
See application file for complete search history.

(56) References Cited

U.S. PATENT DOCUMENTS

| | | | | |
|---|---|---|---|---|
| 9,853,259 | B2 | 12/2017 | Lee | |
| 2006/0093905 | A1* | 5/2006 | Kim | H01M 50/183 |
| | | | | 429/175 |
| 2006/0210872 | A1* | 9/2006 | Yageta | H01M 50/147 |
| | | | | 429/185 |
| 2010/0028772 | A1* | 2/2010 | Yang | H01M 50/578 |
| | | | | 429/185 |
| 2012/0321935 | A1 | 12/2012 | Kim et al. | |
| 2014/0356672 | A1* | 12/2014 | Lee | H01M 10/425 |
| | | | | 429/94 |
| 2016/0020434 | A1 | 1/2016 | Kwon et al. | |
| 2016/0144988 | A1 | 5/2016 | Kwon | |
| 2016/0294014 | A1* | 10/2016 | Shirai | H01M 4/1393 |
| 2019/0393455 | A1* | 12/2019 | Seo | H01M 10/04 |

FOREIGN PATENT DOCUMENTS

| | | | | | |
|---|---|---|---|---|---|
| CN | 202687165 | U | | 1/2013 | |
| CN | 205004360 | U | | 1/2016 | |
| CN | 106207268 | A | * | 12/2016 | .......... H01M 10/058 |
| CN | 205881957 | U | | 1/2017 | |
| EP | 2869361 | A1 | * | 5/2015 | ........ H01M 10/0404 |
| JP | 2004039271 | A | | 2/2004 | |
| JP | 2004273174 | A | * | 9/2004 | |
| JP | 2011159389 | A | | 8/2011 | |
| JP | 2014032924 | A | * | 2/2014 | |
| JP | 2015165460 | A | | 9/2015 | |
| KR | 100586896 | B1 | | 6/2006 | |
| KR | 20080034223 | A | * | 10/2006 | ............ H01M 10/04 |
| KR | 20130092800 | A | | 8/2013 | |
| KR | 20140142649 | A | | 12/2014 | |
| KR | 20150134304 | A | | 12/2015 | |
| KR | 20160019259 | A | * | 2/2016 | |
| KR | 20160026060 | A | | 3/2016 | |
| KR | 101858790 | B1 | * | 6/2016 | |
| KR | 101650044 | B1 | | 8/2016 | |
| KR | 20160100602 | A | | 8/2016 | |
| KR | 20160130588 | A | | 11/2016 | |
| KR | 20190023649 | A | * | 8/2017 | ............ H01M 10/04 |

OTHER PUBLICATIONS

Inoue et al; "JP2004273174—Battery Pack"; Machine Translation of JP 2004273174 obtained from WIPO IP Portal (Year: 2004).*
Saito; "Film Sheathed Battery and Method for Manufacturing the Same"; Machine translation of JP-2014032924-A obtained from WIPO IP Portal (Year: 2014).*
Han; "KR101858790B1 Pouch type secondary battery"; Machine Translation of KR-101858790-B1 obtained from ESpacenet Patent Translate (Year: 2016).*
You et al; "Method of preparing secondary battery"; Google Patents machine translation of KR 20080034223 A (Year: 2008).*
Machine translation of JP-2014032924-A obtained from WIPO IP Portal (Year: 2014).*
Wu et al; "1. CN 106207268—Automatic Positioning Fixture of Lithium Battery"; Machine translation of CN 106207268 A obtained from WIPO IP Portal (Year: 2016).*
International Search Report for Application No. PCT/KR2018/007477, mailed Oct. 17, 2018, pp. 1-2.
Extended European Search Report including Written Opinion for Application No. EP18867595.3, dated Jun. 12, 2020, pp. 1-8.
Search Report for Chinese Application No. 201880022846.1 dated Sep. 28, 2021. 3 pgs.

* cited by examiner

BEFORE DEGASSING        AFTER DEGASSING

BEFORE DEGASSING          AFTER DEGASSING

CRACK-PREVENTION SEALING BLOCK FOR POUCH-SHAPED SECONDARY BATTERIES, POUCH-SHAPED BATTERY CASE MANUFACTURED USING THE SAME, AND METHOD OF SEALING POUCH-SHAPED BATTERY CASE

CROSS-REFERENCE TO RELATED APPLICATIONS

This application is a continuation of International Application No. PCT/KR2018/007477, filed Jul. 2, 2018, published in Korean, which claims the benefit of Korean Patent Application No. 10-2017-0134309 filed on Oct. 17, 2017 with the Korean Intellectual Property Office, the disclosures of which are herein incorporated by reference in their entirety.

TECHNICAL FIELD

The present invention relates to a sealing block for pouch-shaped secondary batteries that is capable of preventing cracks from being generated in a battery case, a pouch-shaped battery case manufactured using the same, and a method of sealing a pouch-shaped battery case, and more particularly to a sealing block for sealing a pouch-shaped secondary battery, the sealing block including a main body unit for sealing at least a part of an outer edge of a battery case from which an electrode terminal protrudes by applying heat and/or pressure thereto and a wrinkle prevention unit coupled perpendicularly to one surface of the main body unit, the wrinkle prevention unit including a curved structure that corresponds to a rounded corner of an electrode assembly reception unit of the battery case, wherein the wrinkle prevention unit further includes an extension portion for connecting the curved structure of the wrinkle prevention unit to the main body unit.

BACKGROUND ART

Lithium secondary batteries may be classified into a cylindrical battery, a prismatic battery, and a pouch-shaped battery based on the shape of a battery case. The cylindrical battery is a battery that is configured to have a structure in which an electrode assembly is mounted in a metal can. The prismatic battery is also a battery that is configured to have a structure in which an electrode assembly is mounted in a metal can. The pouch-shaped battery is a battery that is configured to have a structure in which an electrode assembly is generally mounted in a pouch-shaped battery case made of an aluminum laminate sheet. Among these battery cells, the pouch-shaped battery, which can be stacked with high integration, has high energy density per unit weight, is inexpensive, and can be easily modified, has attracted considerable attention.

The pouch-shaped battery case may be classified as a separable battery case, in which an upper case and a lower case are capable of being separated from each other, or as an integrated battery case, in which the upper case and the lower case are connected to each other. As the demand for high-capacity secondary batteries has increased in recent years, a battery case configured to have a structure in which an electrode assembly reception unit is formed in each of upper and lower cases that are separated from each other in order to receive a thick electrode assembly has been used.

In order to seal the battery case, the upper case and the lower case are placed such that the outer edges thereof face each other, and the other outer edges are sealed, excluding some of the outer edges for gas discharge, which is formed as a non-sealed portion. Gas is discharged from the battery case and an electrolytic solution is introduced into the battery case through the non-sealed portion.

When manufacturing a secondary battery, charging, discharging, and degassing processes are performed repeatedly. When the degassing process is performed in a vacuum and decompression state, stress is concentrated on the corners of a concave unit for receiving the electrode assembly formed in the battery case. As a result, the portions of the battery case in the vicinity of the corners of the concave unit become distorted and warped, whereby wrinkles are formed in the battery case.

As the result of repetitive vacuum decompression and expansion, the corresponding portions of the battery case become torn due to the wrinkles, thus serving as seeds starting at which openings may be formed in the battery case. Consequently, the battery case becomes defective.

FIG. 1 is a plan view showing a conventional sealing block, and FIG. 2 is photographs showing the state in which cracks are generated at a corner of an electrode assembly reception unit formed in a battery case, manufactured using the sealing block of FIG. 1, before and after degassing.

Referring to FIGS. 1 and 2, a sealing block 10 includes a main body unit 11, which is formed so as to have an elongated rectangular shaped side when viewed in a plan view, and a protrusion unit 12, which protrudes perpendicularly from one side of the main body unit 11. The protrusion unit 12 is provided on one surface thereof, which faces an electrode assembly, with a curved surface 13.

In the case in which a battery case is manufactured using the sealing block configured to have the above-described structure, wrinkles 20 are formed at a corner of an electrode assembly reception unit before degassing. As a result, a specific angle is formed between adjacent surfaces, whereby a bent portion is formed. In the case in which the battery case undergoes vacuum decompression and compression processes, stress is concentrated on the wrinkles 20 formed at the corner of the electrode assembly reception unit. As a result, cracks 30 are generated at the corner of the electrode assembly reception unit, as shown in a photograph showing the state after degassing.

In order to prevent wrinkles from being formed in the vicinity of the corners of a concave unit of the battery case, the sealing block shown in FIG. 1, i.e. a sealing block that is generally formed in the shape of an alphabet letter r, is used; in this case, however, the above-mentioned problem cannot be completely solved.

In connection therewith, Korean Patent Application Publication No. 2016-0026060 discloses a polymer battery including a sealing region layer for sealing the interior of a pouch-shaped sheathing member inside the pouch-shaped sheathing member and a non-sealing region layer formed outside the pouch-shaped sheathing member, the non-sealing region layer being provided with a section exposure portion having a larger thickness than the periphery of the pouch-shaped sheathing member, and Korean Patent Application Publication No. 2013-0092800 discloses a battery cell configured to have a structure in which films are attached to corners of a battery unit received in a battery case. However, these publications do not suggest any obvious solution for preventing wrinkles from being formed at the corners of the electrode assembly reception unit of the battery case.

Therefore, there is an urgent necessity for technology that is capable of preventing wrinkles from being formed at the corners of a concave unit for receiving an electrode assembly at the time of manufacturing a pouch-shaped battery.

DISCLOSURE

Technical Problem

The present invention has been made in view of the above problems and other technical problems that have yet to be resolved, and it is an object of the present invention to provide a sealing block for preventing wrinkles/crack from being formed in rounded corners of a pouch-shaped battery case, in which an electrode assembly is mounted, a pouch-shaped battery case manufactured using the same, and a method of sealing a pouch-shaped battery case.

Technical Solution

In accordance with an aspect of the present invention, the above and other objects can be accomplished by the provision of a sealing block for sealing a pouch-shaped secondary battery, the sealing block including a main body unit for sealing at least a part of an outer edge of a battery case from which an electrode terminal protrudes by applying heat and/or pressure thereto and a wrinkle prevention unit coupled perpendicularly to one surface of the main body unit, the wrinkle prevention unit including a curved structure that corresponds to a rounded corner of an electrode assembly reception unit of the battery case, wherein the wrinkle prevention unit further includes an extension portion for connecting the curved structure of the wrinkle prevention unit to the main body unit.

As the demand for high-output, large-capacity secondary batteries has increased, the thickness of the electrode assembly has been increased, and the depth of a concave unit for receiving the electrode assembly has also been increased in order to receive the thickened electrode assembly. In consideration of the properties of the battery case, which is made of a laminate sheet including a resin layer and a metal layer, the thickness of the battery case may be increased in order to form a deeply concave unit. In this case, however, the capacity of the battery may be reduced, which is undesirable. For this reason, the concave unit for receiving the electrode assembly is formed in an upper case and a lower case, whereby it is possible to receive a thick electrode assembly. The battery case having the above structure may be used as a battery case for high-capacity secondary batteries.

The electrode assembly may be a jelly-roll type (wound type) electrode assembly, which is configured to have a structure in which long sheet type positive electrodes and long sheet type negative electrodes are wound in the state in which separators are interposed respectively between the positive electrodes and the negative electrodes, a stacked type electrode assembly, which is configured to have a structure in which a plurality of positive electrodes cut so as to have a predetermined size and a plurality of negative electrodes cut so as to have a predetermined size are sequentially stacked in the state in which separators are interposed respectively between the positive electrodes and the negative electrodes, a stacked/folded type electrode assembly, which is configured to have a structure in which bi-cells or full cells, each of which is configured to have a structure in which predetermined numbers of positive electrodes and negative electrodes are stacked in the state in which separators are disposed respectively between the positive electrodes and the negative electrodes, are wound using a separation sheet, or a laminated/stacked type electrode assembly, which is configured to have a structure in which bi-cells or full cells are stacked and laminated in the state in which separators are disposed respectively between the bi-cells or the full cells.

The stacked type electrode assembly, the stacked/folded type electrode assembly, and the laminated/stacked type electrode assembly may be configured to have a structure in which positive electrode tabs and negative electrode tabs protrude from rectangular electrode plates in opposite directions, or may be configured to have a structure in which positive electrode tabs and negative electrode tabs protrude from the same sides of rectangular electrode plates. In the case in which a large-capacity secondary battery is manufactured, an electrode assembly configured to have a structure in which positive electrode tabs and negative electrode tabs protrude in opposite directions may be used for achieving respective connections to an external device.

During the manufacture of the pouch-shaped battery case, the other outer edges of the battery case excluding one of the outer edges of the battery case are sealed, and charging, discharging, and degassing processes for activating the battery are performed several times in order to place the electrode assembly in the battery case, to discharge gas from the battery case, and to inject an electrolytic solution into the battery case. At this time, the battery case is distorted and warped as the result of vacuum decompression of the battery case in order to discharge gas from the battery case, whereby wrinkles are formed in the battery case.

In particular, since corners of the concave unit, in which the electrode assembly is mounted, are stretched in order to form the concave unit, the thickness of the corners of the concave unit is smaller than the thickness of other portions of the concave unit. As a result, wrinkles may be easily formed at the corners of the concave unit when the battery case undergoes the vacuum decompression process.

In the case in which the sealing block includes a wrinkle prevention unit including a curved structure that corresponds to the rounded corner of the electrode assembly reception unit of the battery case and in which the wrinkle prevention unit further includes an extension portion extending from a main body unit, the main body unit located at an outer edge of the battery case that is parallel to the outer edge of the battery case at which the electrode terminal is located, for connecting the curved structure of the wrinkle prevention unit to the main body unit, as in the present invention, a sealed portion may be formed so as to be adjacent to the corner of the electrode assembly reception unit due to the extension portion, whereby it is possible to minimize the deformation of the battery case. Consequently, it is possible to prevent wrinkles from being formed at the corner of the electrode assembly reception unit.

Therefore, it is possible to solve a problem in which the battery case is torn as the result of degassing due to wrinkles formed in the battery case, whereby it is possible to remarkably reduce the defect rate of the pouch-shaped battery case.

In a concrete example, the main body unit may be configured to have a structure including a surface that is opposite the sealed portion formed at the outer edge of a battery case at which the electrode terminal is located in consideration of the fact that the main body unit is a part for sealing the outer edge of a battery case at which the electrode terminal is located and the outer edge of the battery case parallel thereto. Specifically, the main body unit may be formed in the shape of a square pillar including a rectangular side surface.

The extension portion may protrude from the main body unit so as to extend to the rounded corner of the electrode assembly reception unit. As a result, the curved structure of the wrinkle prevention unit may be located so as to be adjacent to the corner of the electrode assembly reception unit due to the extension portion. In the case in which the battery case is manufactured using the sealing block having the above structure, therefore, the sealed portion formed at the outer edge of the battery case may extend to the boundary of the rounded corner of the electrode assembly reception unit, whereby it is possible to more effectively prevent wrinkles from being formed in the corner of the electrode assembly reception unit.

In general, when a degassing process is performed in order to discharge gas from the battery case during the manufacture of the pouch-shaped battery, the open outer edge of the battery case, through which gas is discharged, is formed so as to be concave further inward than the outer edge of the battery case opposite the open outer edge of the battery case (i.e. the sealed outer edge of the battery case). Consequently, it is further necessary to provide technology that is capable of preventing the deformation of the outer edge of the battery case through which gas is discharged. The wrinkle prevention unit may be located at one of the corners of opposite ends of the outer edge of the electrode assembly reception unit through which gas is charged.

In the case in which the wrinkle prevention unit of the sealing block is located at each of the corners of the opposite ends of the outer edge of the electrode assembly reception unit through which gas is charged, it is possible to prevent wrinkles from being formed in the corners of the opposite ends of the outer edge of the electrode assembly reception unit through which gas is charged, whereby it is possible to remarkably reduce the defect rate of the battery case.

In a concrete example, a sealing block assembly may include a first sealing block, the main body unit of which is located on the outer edge of the battery case from which the electrode terminal protrudes, and a second sealing block, the main body unit of which is located on an outer edge of the battery case parallel to the outer edge of the battery case from which the electrode terminal protrudes, and the first sealing block and the second sealing block may be formed so as to be symmetrical with each other.

That is, the sealing block assembly may be located at opposite sealed portions of the pouch-shaped battery case that are adjacent to the outer edge of the battery case through which gas is discharged. In consideration of the fact that the first sealing block and the second sealing block are located at opposite ends of the outer edge of the battery case at which the electrode terminal is located and that the sealed portions formed at opposite sides of the electrode assembly based on the central axis of the electrode assembly that is perpendicular to the major-axis direction of the battery case in which the electrode terminal protrudes from the electrode assembly are symmetrical to each other, the first sealing block and the second sealing block may be formed so as to be symmetrical with each other.

Meanwhile, the sealing block assembly may further include a third sealing block located between the first sealing block and the second sealing block for connecting the first sealing block and the second sealing block to each other. The third sealing block may be independent of the first sealing block and the second sealing block.

That is, the third sealing block is located at a position that corresponds to the major-axis direction of the pouch-shaped battery case. In the case in which the third sealing block is independent of the first sealing block and the second sealing block, the third sealing block may be replaced depending on the major-axis length of the pouch-shaped battery case to be sealed.

Alternatively, the third sealing block may be coupled to the first sealing block and the second sealing block. In the case in which the first sealing block is connected to one end of the third sealing block in the state in which the first sealing block is perpendicular to the third sealing block and in which the second sealing block is connected to the other end of the third sealing block in the state in which the second sealing block is perpendicular to the third sealing block while being opposite the first sealing block, it is possible to reduce the time necessary to position the sealing blocks for sealing the outer edge of the battery case, since the sealing blocks are connected to each other.

In accordance with another aspect of the present invention, there is provided a pouch-shaped battery case manufactured using the sealing block.

The pouch-shaped battery case may be configured to have a structure in which at least one of an upper case and a lower case constituting the pouch-shaped battery case is provided with an electrode assembly reception unit, in which a non-sealed portion for gas discharge is formed at one-side outer edge of the electrode assembly reception unit, and in which sealed portions, each of which has a radius of curvature corresponding to the radius of curvature of a corner of the outer edge of the electrode assembly reception unit, are formed at opposite ends of the outer edge of the electrode assembly reception unit at which the non-sealed portion for gas discharge is formed.

Each of the sealed portions may be formed so as to be adjacent to the boundary of the corner of the outer edge of the electrode assembly reception unit.

That is, in the pouch-shaped battery case according to the present invention, the sealed portions are formed so as to be adjacent to the boundaries of the corners of the outer edge of the electrode assembly reception unit. Even when the decompression and compression processes are performed repeatedly for degassing during the manufacture of the secondary battery, therefore, the curved structure of each of the corners of the outer edge of the electrode assembly reception unit is maintained, whereby it is possible to prevent wrinkles from being formed in the battery case.

In accordance with a further aspect of the present invention, there is provided a method of sealing the pouch-shaped battery case.

The method of sealing the pouch-shaped battery case may include:
(a) putting an electrode assembly in the battery case and placing an upper case and/or a lower case such that outer edges thereof are aligned with each other;
(b) placing a first sealing block assembly according to the present invention on an upper surface of the upper case such that the first sealing block assembly contacts corners of an electrode assembly reception unit thereof;
(c) placing a second sealing block assembly according to the present invention on a lower surface of the lower case such that the second sealing block assembly contacts corners of an electrode assembly reception unit thereof; and
(d) applying heat and/or pressure to at least one of the first and second sealing block assemblies in order to seal the battery case.

Specifically, the step (b) may include locating a main body unit of a first sealing block of the first sealing block assembly on an outer edge of the battery case from which an electrode terminal protrudes and locating a main body unit of a second sealing block of the first sealing block assembly on an outer edge of the battery case parallel to the outer edge of the battery case from which the electrode terminal protrudes.

That is, in the case in which the battery case is sealed in the state in which the first sealing block and the second sealing block are located on the outer edge of the battery case, sealing portions are formed even at the regions of the battery case that are adjacent to the corners of the electrode assembly reception unit, whereby it is possible to prevent wrinkles from being formed in the battery case.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 3:
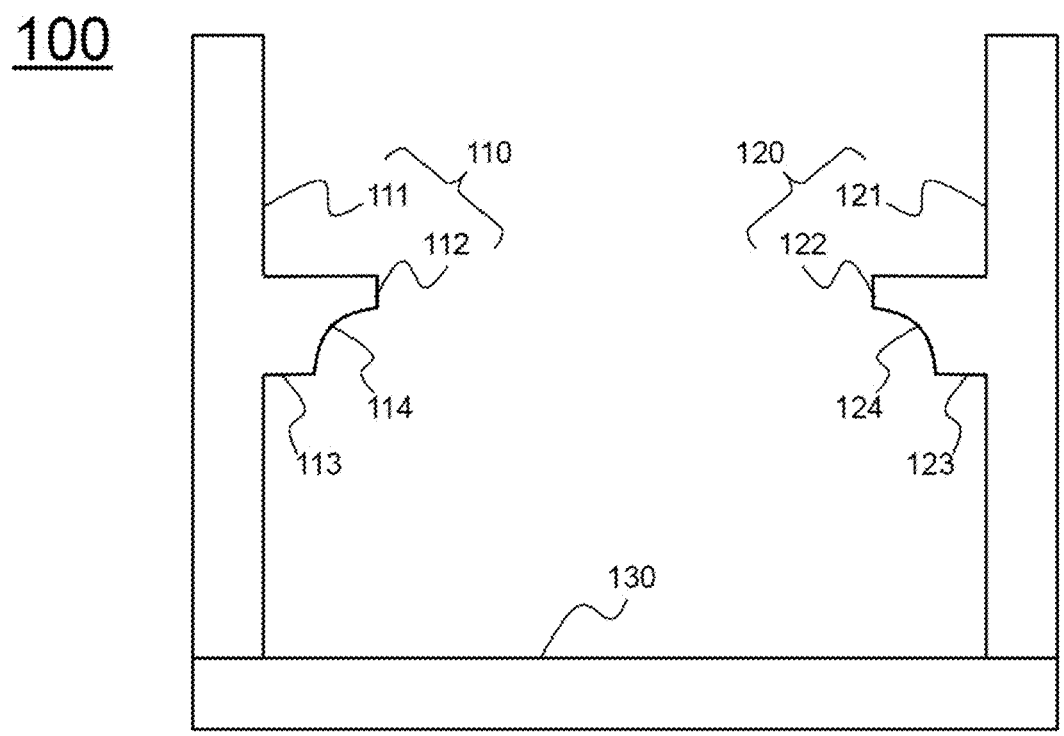
FIG. 3 is a plan view showing a sealing block according to an embodiment of the present invention.

FIG. 3 is a plan view schematically showing a sealing block according to an embodiment of the present invention.

Referring to FIG. 3, a sealing block assembly 100 includes a first sealing block 110, a second sealing block 120, and a third sealing block 130.

The first sealing block 110 includes a main body unit 111 for sealing at least a part of an outer edge of a battery case from which an electrode terminal protrudes and an outer edge of the battery case parallel thereto by applying heat and/or pressure thereto and a wrinkle prevention unit 112 coupled perpendicularly to one surface of the main body unit 111, the wrinkle prevention unit 112 including a curved structure 114, which corresponds to a rounded corner of an electrode assembly reception unit of the battery case. The wrinkle prevention unit 112 further includes an extension portion 113 for connecting the curved structure 114 to the main body unit 111.

The second sealing block 120 includes a main body unit 121 for sealing at least a part of an outer edge of a battery case from which an electrode terminal protrudes and an outer edge of the battery case parallel thereto by applying heat and/or pressure thereto and a wrinkle prevention unit 122 coupled perpendicularly to one surface of the main body unit 121, the wrinkle prevention unit 122 including a curved structure 124, which corresponds to a rounded corner of an electrode assembly reception unit of the battery case. The wrinkle prevention unit 122 further includes an extension portion 123 for connecting the curved structure 124 to the main body unit 121.

The first sealing block 110 and the second sealing block 120 are formed so as to be symmetrical with each other. One end of the first sealing block and one end of the second sealing block are located at respective opposite ends of the third sealing block 130.

The third sealing block 130 may be independent of the first sealing block 110 and the second sealing block 120 so as to be separated from the first sealing block 110 and the second sealing block 120, or may be fixedly coupled to the first sealing block 110 and the second sealing block 120.

Figure 4:
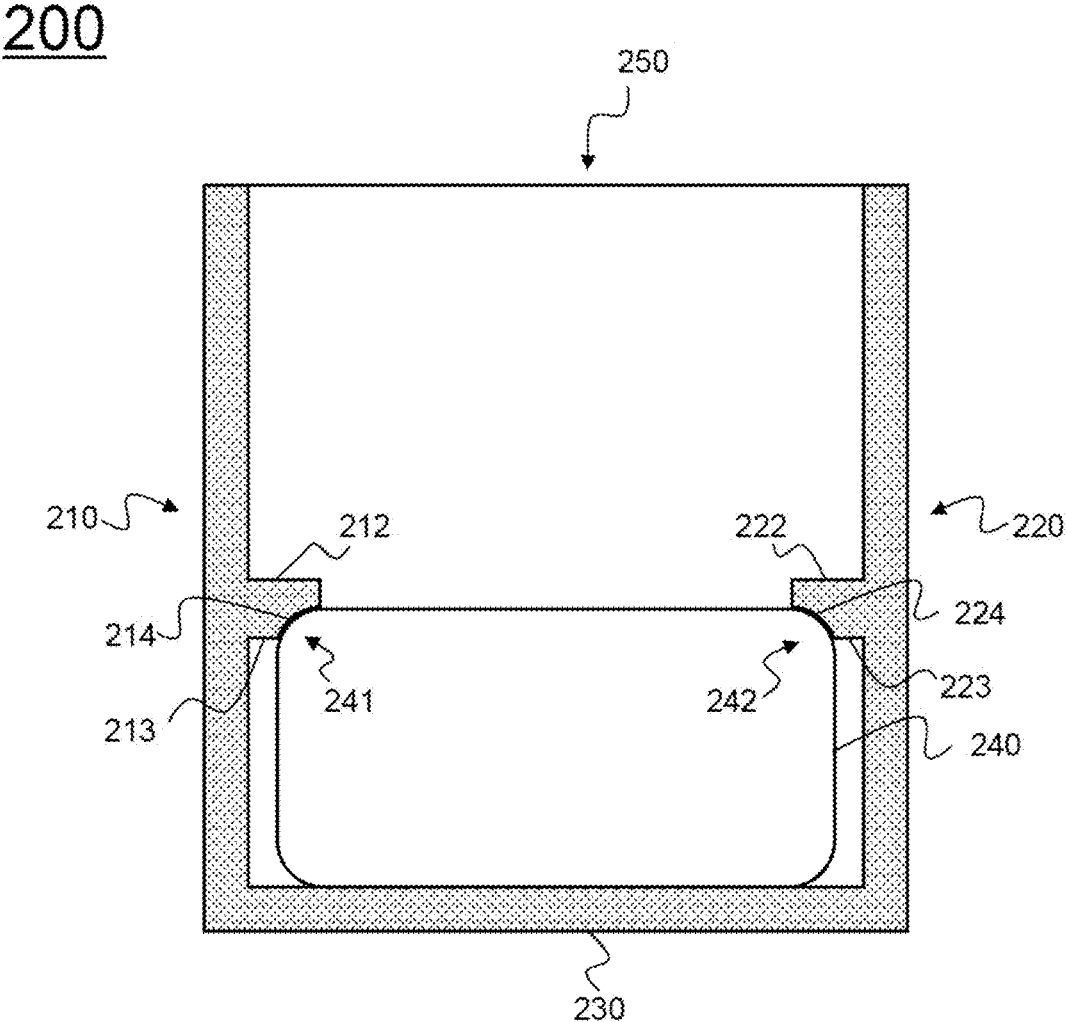
FIG. 4 is a plan view showing a pouch-shaped battery case according to an embodiment of the present invention.

FIG. 4 is a plan view schematically showing a pouch-shaped battery case according to an embodiment of the present invention.

Referring to FIG. 4, a pouch-shaped battery case 200 is provided in one side thereof with an electrode assembly reception unit 240, and a left outer edge sealed portion 210, a right outer edge sealed portion 220, and a lower outer edge sealed portion 230 are formed at outer edges of the electrode assembly reception unit 240.

No sealed portion is formed in the middle of an outer edge of the electrode assembly reception unit 240 in a gas discharge direction 250, but a corner sealed portion 212, which extends from the left outer edge sealed portion 210, is formed at one of the opposite ends of the outer edge of the electrode assembly reception unit 240 in the gas discharge direction 250. The corner sealed portion 212, which includes a curved surface 214 having a radius of curvature corresponding to the radius of curvature of a corner 241 of the electrode assembly reception unit and an extension portion 213 for connecting the curved surface 214 to the left outer edge sealed portion 210, is formed so as to be adjacent to the corner 241 of the electrode assembly reception unit.

In addition, a corner sealed portion 222, which extends from the right outer edge sealed portion 220, is formed at the other of the opposite ends of the outer edge of the electrode assembly reception unit 240 in the gas discharge direction 250. The corner sealed portion 222, which includes a curved surface 224 having a radius of curvature corresponding to the radius of curvature of a corner 242 of the electrode assembly reception unit and an extension portion 223 for connecting the curved surface 224 to the right outer edge sealed portion 220, is formed so as to be adjacent to the corner 242 of the electrode assembly reception unit.

Since the sealed portions are formed so as to be adjacent to the boundaries of the corners 241 and 242, as described above, the portions of the battery case that are adjacent to the corners 241 and 242 are fixed in a sealed state, whereby the battery case is not easily deformed. When a battery cell using the battery case undergoes a degassing process, therefore, it is possible to prevent the battery case from wrinkling or cracking.

Hereinafter, the present invention will be described with reference to the following example. This example is provided only for illustration of the present invention and should not be construed as limiting the scope of the present invention.

EXAMPLE

A stacked type electrode assembly, which is configured to have a structure in which a separator is interposed between a positive electrode and a negative electrode and which has a thickness of 10 mm, is put in a battery case, and an upper case and a lower case are placed such that the outer edges thereof are aligned with each other. The battery case is configured to have a structure in which an electrode assembly reception unit is formed in the upper case and in the lower case. The electrode assembly is configured to have a structure in which a positive electrode terminal and a negative electrode terminal protrude in different directions.

The sealing block of FIG. 3 is placed at upper and lower outer edges of the upper case and the lower case such that the curved surfaces of the wrinkle prevention units of the sealing block contact the corners of the electrode assembly reception unit.

Heat and pressure are applied to the sealing block in order to seal the other outer edges of the battery case, excluding one of the outer edges of the battery case.

The shapes of the corners of opposite ends of the non-sealed portion of the battery case are measured using an optical measuring machine (OMM) such as an optical microscope. The measurement results are shown in FIG. 5 (a photograph before degassing).

The sealed battery case is placed in a vacuum chamber, and a degassing process of decompressing the battery case into a vacuum state and compressing the battery case to a normal pressure is carried out three times.

The battery case is removed from the vacuum chamber, and the shapes of the corners of the opposite ends of the non-sealed portion of the battery case are measured using the optical microscope. The measurement results are shown in FIG. 5 (a photograph after degassing).

Figure 1:
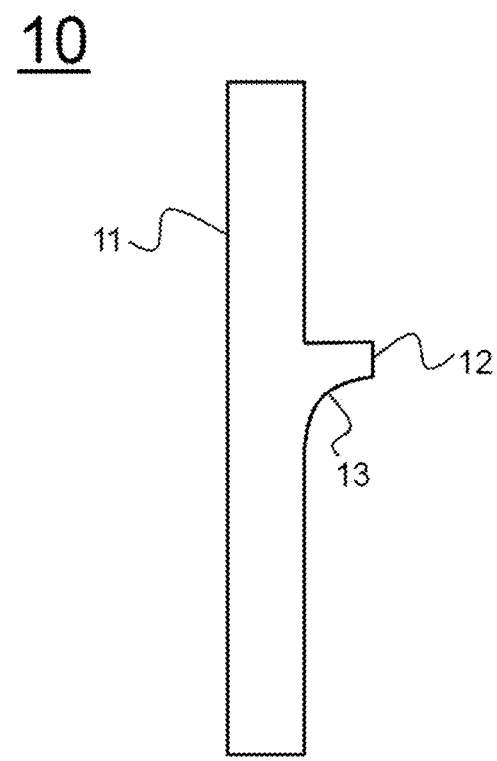
FIG. 1 is a plan view showing a conventional sealing block.
Figure 2:
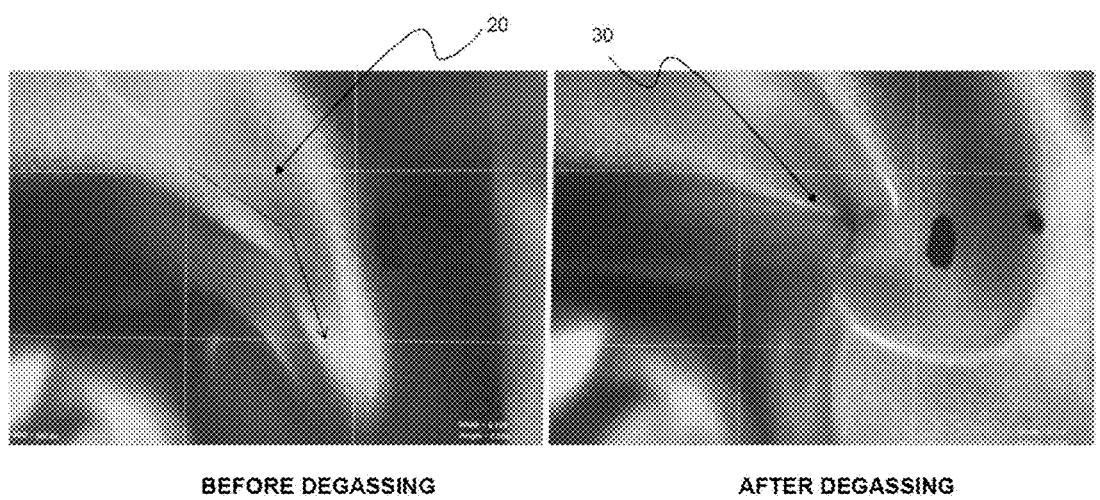
FIG. 2 is photographs showing the state in which cracks are generated at a corner of an electrode assembly reception unit formed in a battery case, manufactured using the sealing block of FIG. 1, before and after degassing.
Figure 5:
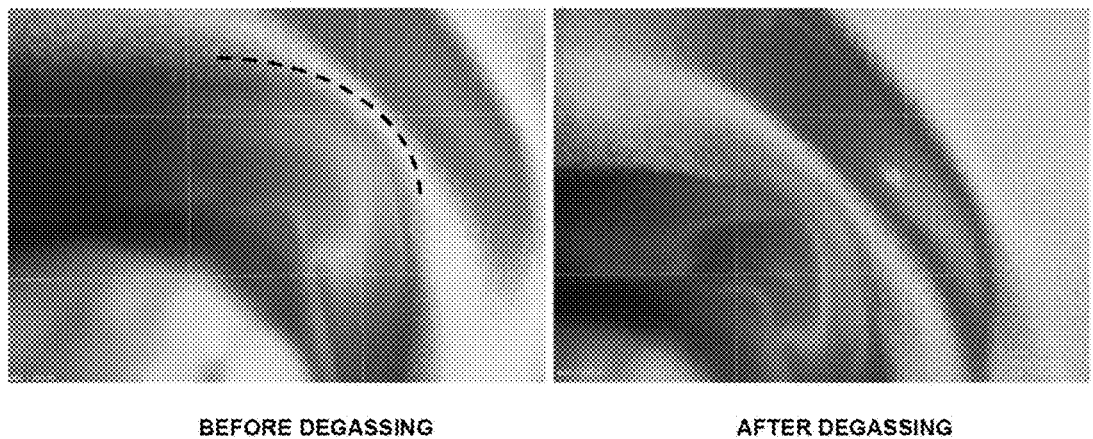
FIG. 5 is photographs showing the state in which no cracks are generated in a pouch-shaped battery case according to the present invention before and after degassing.

Referring to FIG. 5, it can be seen than a curved structure is formed at the corner, unlike the case in which an angular structure having wrinkles is formed at the corner, as shown in FIG. 2.

In addition, the deformation of the corner, i.e. a reduction in the radius of curvature of the corner, is observed after a degassing process; however, no wrinkles bent while forming a specific angle are found.

Even when decompression and compression processes are carried out on the battery case three or more times, therefore, no seeds, from which cracks may generated, are found, whereby it is possible to prevent the corners of the battery case from being torn.

Those skilled in the art to which the present invention pertains will appreciate that various applications and modifications are possible based on the above description, without departing from the scope of the present invention.

INDUSTRIAL APPLICABILITY

As is apparent from the above description, the sealing block according to the present invention includes a main body unit for sealing the outer edge of a battery case parallel to the direction in which an electrode terminal protrudes and a wrinkle prevention unit including a curved structure that corresponds to a rounded corner of an electrode assembly reception unit of the battery case, wherein the wrinkle prevention unit further includes an extension portion for connecting the curved structure of the wrinkle prevention unit to the main body unit. In the case in which a pouch-shaped battery case is manufactured using the sealing block, a sealed portion is formed at the corner of the outer edge of the electrode assembly reception unit, whereby it is possible to prevent the battery case from being easily deformed.

Consequently, it is possible to prevent wrinkles from being formed at the corner of the concave unit due to the concentration of stress on the corner of the concave unit as the result of repetitive vacuum decompression of the battery case in order to discharge gas from the battery case.

The invention claimed is:

1. A sealing block for sealing a pouch-shaped secondary battery, the sealing block comprising:
a main body unit for sealing at least a part of an outer edge of a battery case from which an electrode terminal protrudes by applying heat and/or pressure thereto, the main body unit having a dimension extending along a first direction; and
a wrinkle prevention unit coupled perpendicularly to one surface of a central part of the main body unit, the one surface extending along the first direction, the wrinkle prevention unit having a dimension extending along the first direction that is shorter than the dimension of the main body unit,
wherein the wrinkle prevention unit comprises a concavely curved structure and an extension portion, the extension portion extended from the main body unit and disposed between the main body unit and the concavely curved structure for connecting the concavely curved structure of the wrinkle prevention unit to the main body unit,
wherein the concavely curved structure of the wrinkle prevention unit corresponds to only one rounded corner formed at an intersection of two side surfaces of an electrode assembly reception unit of the battery case and is configured to be located adjacent to a boundary of the rounded corner of the electrode assembly reception unit such that an outline of a contact surface of the wrinkle prevention unit adjacent to the electrode assembly reception unit is a concave curve, whereby the concavely curved structure minimizes the formation of wrinkles at the rounded corner of the electrode assembly reception unit.

2. The sealing block according to claim 1, wherein the main body unit is formed in a shape of a square pillar comprising a rectangular side surface.

3. The sealing block according to claim 1, wherein the extension portion protrudes from the main body unit so as to extend to the rounded corner of the electrode assembly reception unit.

4. The sealing block according to claim 1, wherein the wrinkle prevention unit is located at one of corners of opposite ends of an outer edge of the electrode assembly reception unit through which gas is charged.

5. A sealing block assembly comprising:
a first sealing block according to claim 1, the main body unit of which is located on an outer edge of a battery case from which an electrode terminal protrudes, and
a second sealing block according to claim 1, the main body unit of which is located on an outer edge of the battery case parallel to the outer edge of the battery case from which the electrode terminal protrudes, wherein the first sealing block and the second sealing block are formed so as to be symmetrical with each other.

6. The sealing block assembly according to claim 5, further comprising a third sealing block for connecting the first sealing block and the second sealing block to each other.

7. The sealing block assembly according to claim 6, wherein the third sealing block is removably coupled to the first sealing block and the second sealing block.

8. A pouch-shaped battery case manufactured using a sealing block for sealing the pouch-shaped secondary battery, the sealing block comprising:
a main body unit for sealing at least a part of an outer edge of a battery case from which an electrode terminal protrudes by applying heat and/or pressure thereto, the main body unit having a dimension extending along a first direction; and
a wrinkle prevention unit coupled perpendicularly to one surface of a central part of the main body unit, the one surface extending along the first direction, the wrinkle prevention unit having a dimension extending along the first direction that is shorter than the dimension of the main body unit,
wherein the wrinkle prevention unit comprises a concavely curved structure and an extension portion, the extension portion extended from the main body unit and disposed between the main body unit and the concavely curved structure for connecting the concavely curved structure of the wrinkle prevention unit to the main body unit, wherein the concavely curved structure corresponds to a rounded corner of an electrode assembly reception unit of the battery case,
wherein the concavely curved structure of the wrinkle prevention unit is configured to be located adjacent to a boundary of the rounded corner of the electrode assembly reception unit such that an outline of a contact surface of the wrinkle prevention unit adjacent to the electrode assembly reception unit is a concave curve, whereby the concavely curved structure minimizes the formation of wrinkles at the rounded corner of the electrode assembly reception unit;
wherein:
at least one of an upper case and a lower case constituting the pouch-shaped battery case is provided with the electrode assembly reception unit,
a non-sealed portion for gas discharge is formed at one-side outer edge of the electrode assembly reception unit, the non-sealed portion adjacent the boundary of the rounded corner of the electrode assembly reception unit adjacent to which the concavely curved structure of the wrinkle prevention unit is configured to be located, and
sealed portions, each of which has a radius of curvature corresponding to a radius of curvature of a corner of the one-side outer edge of the electrode assembly reception unit, are formed at opposite ends of the outer edge of the electrode assembly reception unit at which the non-sealed portion for gas discharge is formed.

9. The pouch-shaped battery case according to claim 8, wherein each of the sealed portions is formed so as to be adjacent to a boundary of the corner of the outer edge of the electrode assembly reception unit.

10. The sealing block assembly according to claim 6, wherein the first sealing block is connected to a first end of the third sealing block and the second sealing block is connected to a second end of the third sealing block.

11. The sealing block assembly according to claim 6, wherein the third sealing block is fixedly coupled to the first sealing block and the second sealing block.

12. The sealing block according to claim 1, wherein the sealing block is a single monolithic piece.

13. The sealing block assembly according to claim 5,
wherein the concavely curved structure of the wrinkle prevention unit of the first sealing block corresponds to only one rounded corner formed at an intersection of two side surfaces of the electrode assembly reception unit of the battery case, and
wherein the concavely curved structure of the wrinkle prevention unit of the second sealing block corresponds to only one other rounded corner formed at an intersection of two side surfaces of the electrode assembly reception unit of the battery case.

14. A pouch-shaped battery case manufactured using a sealing block assembly for sealing the pouch-shaped secondary battery, the sealing block assembly comprising:
first and second sealing blocks formed so as to be symmetrical with each other, each of the first and second sealing blocks comprising:
a main body unit for sealing at least a part of the battery case by applying heat and/or pressure thereto, the main body unit having a dimension extending along a first direction, wherein the main body unit of the first sealing block is located on an outer edge of the battery case from which an electrode terminal protrudes, and the main body unit of the second sealing block is located on an outer edge of the battery case parallel to the outer edge of the battery case form which the electrode terminal protrudes; and
a wrinkle prevention unit coupled perpendicularly to one surface of a central part of the main body unit, the one surface extending along the first direction, the wrinkle prevention unit having a dimension extending along the first direction that is shorter than the dimension of the main body unit,
wherein the wrinkle prevention unit comprises a concavely curved structure and an extension portion, the extension portion extended from the main body unit and disposed between the main body unit and the concavely curved structure for connecting the concavely curved structure of the wrinkle prevention unit to the main body unit, wherein the concavely curved structure corresponds to a rounded corner of an electrode assembly reception unit of the battery case,
wherein the concavely curved structure of the wrinkle prevention unit is configured to be located adjacent to a boundary of the rounded corner of the electrode assembly reception unit such that an outline of a contact surface of the wrinkle prevention unit adjacent to the electrode assembly reception unit is a concave curve, whereby the concavely curved structure minimizes the formation of wrinkles at the rounded corner of the electrode assembly reception unit;
wherein:
at least one of an upper case and a lower case constituting the pouch-shaped battery case is provided with the electrode assembly reception unit,
a non-sealed portion for gas discharge is formed at one-side outer edge of the electrode assembly reception unit, the non-sealed portion between the boundaries of the rounded corners of the electrode assembly reception unit adjacent to which the concavely curved structures of the wrinkle prevention units of the first and second sealing blocks are configured to be located, and sealed portions, each of which has a radius of curvature corresponding to a radius of curvature of a corner of the one-side outer edge of the electrode assembly reception unit, are formed at opposite ends of the one-side outer edge of the electrode assembly reception unit at which the non-sealed portion for gas discharge is formed.

\* \* \* \* \*